UNITED STATES PATENT OFFICE.

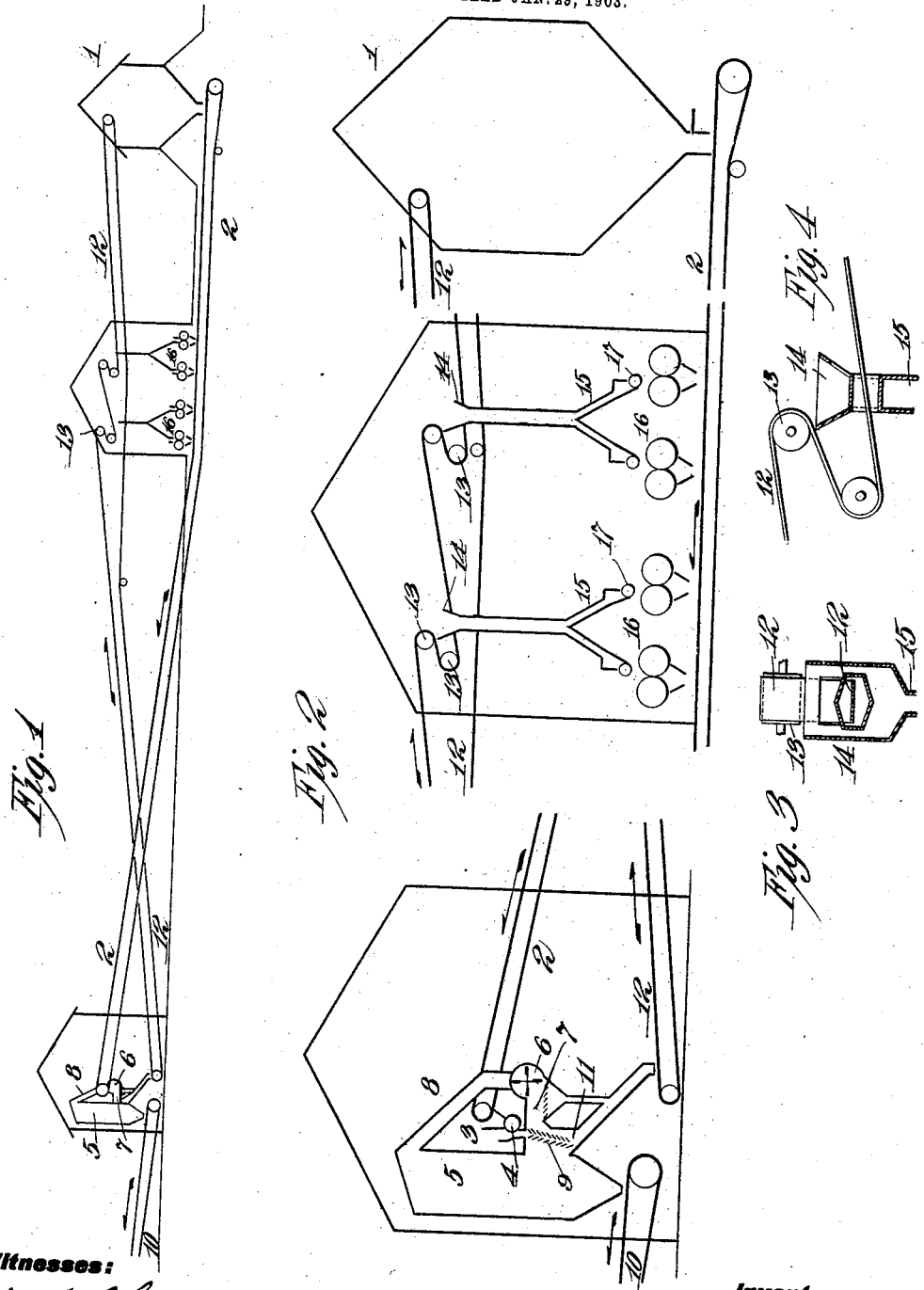

THOMAS A. EDISON, OF LLEWELLYN PARK, ORANGE, NEW JERSEY.

APPARATUS FOR GRINDING AND SEPARATING FINE MATERIALS.

No. 841,677.

Specification of Letters Patent.

Patented Jan. 22, 1907.

Application filed January 29, 1903. Serial No. 140,983.

*To all whom it may concern:*

Be it known that I, THOMAS A. EDISON, a citizen of the United States, residing at Llewellyn Park, Orange, in the county of Essex and State of New Jersey, have invented a certain new and useful Improvement in Apparatus for Grinding and Separating Fine Materials, of which the following is a description.

My invention relates to improved apparatus for separating and grinding fine materials, and particularly to apparatus for feeding ground material from grinding-rolls to a suitable separating device and for returning the tailings of the separator to the grinding-rolls for regrinding, whereby the latter will always be furnished with the maximum load of material. When the grinding-rolls are arranged in a plurality of sets, as is preferable, it becomes important that each set of rolls shall be furnished at all times with the maximum load of material, and it is necessary that this capacity should be present when one or more of the sets of grinding-rolls are shut down for any purpose.

My improved apparatus is of such a character that a plurality of sets of grinding-rolls may be supplied with the maximum load of material at all times without interfering in any way with the shutting down of any one or more of the units for any purpose.

Although the apparatus has been especially designed for use in connection with the manufacture of Portland cement and has been utilized in practice in that special field, yet it will be understood that it may be employed in connection with the separating and grinding of fine materials of any desired character.

In the handling of material in bulk requiring reduction to great fineness it is usual to effect the grinding by a series of operations, so as to secure a product of gradually-decreasing size. For instance, with my Portland-cement plant I first pass the limestone or cement rock, as the case may be, between a pair of massive independently-driven "giant rolls" and then between a plurality of sets of crushing-rolls, by which the material is reduced to a coarse powdered mass the particles of which vary greatly in size. The crushed material is then deposited in a large stock-house in separate conical piles, and from this stock-house it is withdrawn when needed and mixed in the desired proportions of lime and cement rock to form a cement mixture which is deposited in a suitable stock-house for the purpose. From this so-called "small-rock stock-house" the cement mixture undergoes the treatment contemplated by my present invention.

In carrying my invention into effect I first pass the material from the small-rock stock-house to a suitable separating apparatus, by which the small proportion of sufficiently-fine particles in the original crushed material will be removed. The coarse tailings from the separator are returned to the grinding-rolls, preferably arranged in a plurality of sets, and pass through the same, being for the most part reduced to sufficient fineness for ultimate burning. The ground material from the grinding apparatus is now returned to the separator along with material passing directly from the small-rock stock-house, so that the material entering the separator will be composed of a mixture of very fine and coarser particles. I find that by passing the fine particles through the separator concurrently with a very considerable load of coarser particles, preferably in excess of the finer particles, a superior separation is secured, since the coarser particles prevent the fine particles from clotting or aggregating and effect a more perfect presentation of the fine particles to the effect of the separating medium, preferably blasts of air. The apparatus for returning the coarse tailings from the separator to the grinding-rolls is of such a character as to carry a bulk of material sufficient at least to supply all of the grinding-rolls with the maximum load, the arrangement being such that when any of the grinding-rolls are shut down the resulting excess of material will be returned to the small-rock stock-house. In this way the grinding apparatus will always be supplied with the maximum load of material whether all the grinding-rolls are operating or not.

My invention can be carried out in connection with any suitable separating apparatus, although for the handling of cement mixtures I prefer to use a device in which the separation is effected by air-currents, as I describe in my application for Letters Patent filed January 9, 1903, Serial No. 138,428.

In order that the invention may be better understood, attention is directed to the accompanying drawings, forming part of this specification, and in which—

Figure 1 is a diagrammatic view showing the small-rock stock-house, a single separator, four sets of grinding-rolls, and intermediate conveyers for carrying the invention into effect; Fig. 2, an enlarged diagrammatic view of the buildings and their contents shown in Fig. 1, and Figs. 3 and 4 are detail views.

In all of the views corresponding parts are represented by the same numerals of reference.

The small-rock stock-house 1 is provided with a hopper-shaped bottom discharging the crushed material onto a conveyer 2. Material is supplied to the stock-house in any suitable way. The conveyer 2 leads to a hopper 3, supplied with a roller-feed 4, by means of which the material may be fed to the separator in a very thin wide stream. The separator shown is of the type described in my said application and comprises a settling-chamber 5, having a hopper-like bottom, a fan 6, discharging through a flue 7 and supplied with air by one or more conduits 8, leading from the top of the settling-chamber, and deflecting boards or partitions 9 in the flue 7, over which the material passes in a zig-zag course while being subjected to the air-currents. The sufficiently-fine particles separated by the air-blast are carried into the settling-chamber 5, deposited in the bottom thereof by their weight, and are carried off by a conveyer 10 to a suitable chalk stock-house. The heavy coarser tailings not influenced by the blast pass into a hopper 11 and from the latter are deposited on a conveyer 12, leading at its farther end into the top of the stock-house 1. Intermediate of its length the upper run of the conveyer passes over the idlers 13 and deposits material into a hopper 14. From the hopper 14 the material passes into chutes 15 of grinding-rolls 16, the latter being of any suitable type. At the bottom of the chutes 15 I provide a roller-feed 17 or other device for the purpose, by means of which the material from the chutes will be uniformly fed to the grinding-rolls. The hopper 14 is of any suitable type and straddles the conveyer (see Fig. 3) in order that the latter may run over the idlers 13 to permit of a deposit of the material in the hopper.

In operation material from the stock-house is fed by the conveyer 2 to the separator, and within the latter the sufficiently-fine particles are removed and carried off by the conveyer 10. The coarse tailings from the separator are carried by the conveyer 12 and are supplied to the grinding-rolls 16, any surplus being returned to the stock-house. The grinding-rolls reduce the coarse tailings for the greater part to the fineness desired, and this ground material is deposited on the conveyer 2 along with material from the stock-house, so that in consequence the ground material will be mixed with coarser particles, so as to facilitate the separating operation, as I have described, by preventing the finer particles from clotting or aggregating together to thereby become imperfectly subjected to the influence of the separating device. When any set of grinding-rolls requires to be stopped for any purpose, the roller-feed 17 or other device is stopped, in which case the hopper 14, supplying that set of grinding-rolls, continues to supply material to the other set. Obviously, however, the hopper in question will be kept full by only one-half as much material as that formerly supplied to it, and the surplus will overflow onto the conveyer 12, and thereby be returned to the stock-house. In this way it will be seen that any number of grinding-rolls may be employed and that any of the grinding-rolls may be stopped without affecting in any way the supply of the maximum load of material to the other grinding-rolls.

What I claim is—

1. Apparatus for separating and grinding material in bulk, comprising in combination a stock-house for containing the material in bulk, a separator which includes means for separately recovering the finer particles, a grinding apparatus, means for conveying the tailings from the separator to the grinding apparatus, and means for conveying material from both the stock-house and grinding apparatus to the separator, substantially as set forth.

2. Apparatus for separating and grinding material in bulk, comprising in combination a stock-house for containing the material in bulk, a separator which includes means for separately recovering the finer particles, a grinding apparatus, means for conveying the tailings from the separator to the grinding apparatus, means for returning to the stock-house the tailings from the separator in excess of the capacity of the grinding apparatus, and means for conveying material from both the stock-house and grinding apparatus to the separator, substantially as set forth.

3. Apparatus for separating and grinding material in bulk, comprising in combination a stock-house for containing the material in bulk, a separator which includes means for separately recovering the finer particles, a grinding apparatus, a conveyer connecting the tailings-discharge of the separator with the stock-house for returning the tailings from the separator to the stock-house, means for removing material from the tailings-conveyer to the grinding apparatus, and means for conveying material from both the stock-house and grinding apparatus to the separator, substantially as set forth.

4. Apparatus for separating and grinding material in bulk, comprising in combination a stock-house for receiving the material in bulk, a separating apparatus, a conveyer connecting the bottom of the stock-house with the separating apparatus for supplying material to the separating apparatus, a conveyer connecting the tailings-discharge of the separating apparatus with the top of the stock-house, a plurality of grinding apparatus, and means for deflecting material from the tailings-conveyer to the grinding apparatus, substantially as and for the purposes set forth.

5. Apparatus for separating and grinding material in bulk, comprising in combination a stock-house for receiving the material in bulk, a separating apparatus, a conveyer connecting the bottom of the stock-house with the separating apparatus for supplying material to the separating apparatus, a conveyer connecting the tailings-discharge of the separating apparatus with the top of the stock-house, a plurality of grinding apparatus, means for deflecting material from the tailings-conveyer to the grinding apparatus, and connections between the grinding apparatus and the first conveyer for returning material to the separator, substantially as and for the purposes set forth.

6. In a grinding apparatus, the combination with a suitable receptacle for receiving the material to be ground, and a plurality of sets of grinding-rolls, of means for conveying from the bottom of the receptacle a sufficient bulk of material to furnish all of the sets of grinding-rolls with the maximum load, means for deflecting the material to the several sets of grinding-rolls, means for returning to the top of the receptacle any surplus material in excess of the capacity of the grinding-rolls, and an independent feed for each of the grinding-rolls arranged to stop the feed of material to any set when desired, substantially as and for the purposes set forth.

This specification signed and witnessed this 22d day of January, 1903.

THOMAS A. EDISON.

Witnesses:
J. F. RANDOLPH,
FRANK L. DYER.